United States Patent
Kim

(10) Patent No.: US 8,736,923 B2
(45) Date of Patent: May 27, 2014

(54) ELECTROPHOTOGRAPHIC IMAGE FORMING APPARATUS AND SCANNING METHOD THEREOF

(75) Inventor: Su-hwan Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 99 days.

(21) Appl. No.: 13/435,438

(22) Filed: Mar. 30, 2012

(65) Prior Publication Data

US 2013/0021655 A1 Jan. 24, 2013

(30) Foreign Application Priority Data

Jul. 21, 2011 (KR) .................. 10-2011-0072573

(51) Int. Cl.
*H04N 1/04* (2006.01)

(52) U.S. Cl.
USPC ........... 358/475; 358/509; 358/474; 382/274; 382/275; 348/E9.026

(58) Field of Classification Search
CPC .......... H04N 2201/04767; H04N 2201/04744; H04N 9/3129; H04N 9/3179; H04N 9/77; H04N 13/0497; H04N 9/3155; H04N 9/3161; G02B 26/101; G02B 21/0032; G02B 21/0036; G02B 2027/0138; G06F 3/005
USPC ......... 358/474, 482, 296, 409, 481, 475, 509, 358/1.9; 348/E9.026, 744, 68; 382/475, 382/274, 254
See application file for complete search history.

(56) References Cited

U.S. PATENT DOCUMENTS

| | | | | |
|---|---|---|---|---|
| 4,862,289 A | * | 8/1989 | Shimada | 347/247 |
| 5,019,913 A | * | 5/1991 | Kiya et al. | 358/296 |
| 5,294,940 A | * | 3/1994 | Wennagel et al. | 345/31 |
| 5,327,260 A | * | 7/1994 | Shimomae et al. | 358/448 |
| 6,144,366 A | * | 11/2000 | Numazaki et al. | 345/156 |
| 6,560,028 B2 | * | 5/2003 | Melville et al. | 359/630 |
| 6,847,389 B2 | * | 1/2005 | Shiraishi | 347/134 |
| 7,098,448 B2 | * | 8/2006 | Inoue et al. | 250/234 |
| 7,375,847 B2 | * | 5/2008 | Takizawa | 358/1.7 |
| 7,427,747 B2 | * | 9/2008 | Ishihara et al. | 250/234 |
| 7,570,386 B2 | * | 8/2009 | Heink et al. | 358/1.18 |
| 7,619,644 B2 | * | 11/2009 | Johnston | 347/237 |
| 7,944,463 B2 | * | 5/2011 | Toyama et al. | 347/243 |
| 8,134,584 B2 | * | 3/2012 | Choi et al. | 347/234 |
| 8,243,211 B2 | * | 8/2012 | Bazzani et al. | 348/744 |
| 8,259,167 B2 | * | 9/2012 | Ishiwata et al. | 348/65 |
| 8,508,813 B2 | * | 8/2013 | Matsuura et al. | 358/481 |

FOREIGN PATENT DOCUMENTS

KR 10-2008-0000955 1/2008

\* cited by examiner

*Primary Examiner* — Negussie Worku
(74) *Attorney, Agent, or Firm* — Stanzione & Kim, LLP

(57) ABSTRACT

An electrophotographic image forming apparatus including a light scanning device to scan first and second light beams, a synchronization signal detector to receive a portion of the first light beam scanned by the light scanning device and to generate a first horizontal synchronization signal, and a video signal processor including a second horizontal synchronization signal generating unit to count a synchronization signal offset and generate a second horizontal synchronization signal regarding the second light beam when the first horizontal synchronization signal is transmitted from the synchronization signal detector, and a video controller to transfer video data to the light scanning device based on the first and second horizontal synchronization signals.

21 Claims, 9 Drawing Sheets

ELECTROPHOTOGRAPHIC IMAGE FORMING APPARATUS AND SCANNING METHOD THEREOF

CROSS-REFERENCE TO RELATED APPLICATIONS

This application claims priority under 35 USC §119 from Korean Patent Application No. 10-2011-0072573, filed on Jul. 21, 2011, in the Korean Intellectual Property Office, the disclosure of which is incorporated herein in its entirety by reference.

BACKGROUND

1. Field of the Invention

The present general inventive concept relates to an electrophotographic image forming apparatus, and a scanning method thereof, and more particularly, to an electrophotographic image forming apparatus including a light scanning device to scan a plurality of light beams, and a scanning method thereof.

2. Description of the Related Art

A conventional image forming apparatus such as a laser printer forms an image by scanning a light beam onto a photosensitive drum by using a light scanning device to form an electrostatic latent image thereupon, developing the electrostatic latent image by using toner, and transferring the developed toner image onto a printing medium. In order for a light scanning device to scan a light beam onto a photosensitive drum with a correct timing, a synchronization signal detection unit to detect a horizontal synchronization signal of a scanned light beam is required.

Conventionally, in order to produce a color image, a light scanning device scans a plurality of light beams by using one or two polygonal rotating mirrors. In this case, light sources are arranged in such a way that light beams are incident on a polygonal rotating mirror in a vertically symmetrical manner with respect to a center of the polygonal rotating mirror. For example, when a single polygonal rotating mirror is used, light sources are arranged in such a way that light beams of two colors are incident on each of right and left portions of the polygonal rotating mirror with respect to a center of the polygonal rotating mirror. When two polygonal rotating mirrors are used, light sources are arranged in such a way that light beams of a single color are incident on each of right and left portions of the polygonal rotating mirrors with respect to centers of the polygonal rotating mirrors. In a light scanning device including a single polygonal rotating mirror, a conventional synchronization signal detection unit detects a horizontal synchronization signal by using two beam detecting sensors. In a light scanning device including two polygonal rotating mirrors, a conventional synchronization signal detection unit detects a horizontal synchronization signal by using four beam detecting sensors. Such detected horizontal synchronization signals are transferred to a printer video controller (PVC). A PVC transmits video data to a laser diode drive (LDD) in a light scanning apparatus according to a transferred horizontal synchronization signal, and a light source driver controls a power on and/or off of light sources according to the video data so as to emit a light beam.

When a plurality of beam detecting sensors corresponding to a plurality of light beams are present, material costs and likelihood of failure are increased due to the relatively large number of components, and sensitivities of the beam detecting sensors are differently changed due to a changed in temperature, or detection surfaces of the beam detecting sensors may be non-uniformly changed, (e.g., contaminated). Thus, synchronization signal detecting timings of the beam detecting sensors become slightly different from each other, and image quality may deteriorate.

SUMMARY

The present general inventive concept provides an image forming apparatus including a light scanning device to scan a plurality of light beams, and a scanning method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus including a light scanning device to scan first and second light beams, a synchronization signal detector to receive a portion of the first light beam scanned by the light scanning device and to generate a first horizontal synchronization signal, and a video signal processor including a second horizontal synchronization signal generating unit to count a synchronization signal offset and generate a second horizontal synchronization signal regarding the second light beam when the first horizontal synchronization signal is transmitted from the synchronization signal detector, and a video controller to transfer video data to the light scanning device based on the first and second horizontal synchronization signals.

The synchronization signal offset may be determined according to a geometrical arrangement of the first and second light beams in the light scanning device.

The light scanning device may include light sources to emit the first and second light beams, a light deflector including a plurality of reflective surfaces, and an incidence optical system to emit the first and second light beams emitted from the light sources to different reflective surfaces of the light deflector.

The incidence optical system may include at least one of a collimating lens, a cylindrical lens, and a slit.

The light scanning device may include an image forming optical system that focuses first and second light beams deflected by a light deflector on different scanned surfaces to form images.

The light deflector may include a polygonal rotating mirror.

The light deflector may include at least five reflective surfaces.

The synchronization signal offset may be determined according to at least one factor selected from the group consisting of a rotating speed of the light deflector, an incident angle of the first and second light beams, a circumscribing diameter of the light deflector, a distance between a center of the light deflector and the first and second light beams incident on the light deflector, and the number of reflective surfaces of the light deflector.

The light sources and the incidence optical system may be arranged in such a way that the first and second light beams are scanned to two sides with respect to a center of the light deflector.

The synchronization signal detector may include beam detecting sensors, wherein the number of the beam detecting sensors is the same as the number of light deflectors of the light scanning device.

The light scanning device may include light sources to emit first through fourth light beams, a single light deflector including a plurality of reflective surfaces, and an incidence optical system to emit the first and third light beams emitted from the light sources to a first reflective surface of the single light deflector, and to emit the second and fourth light beams emitted from the light sources to a second reflective surface of the single light deflector, wherein the synchronization signal detector may include a single beam detecting sensor to receive a portion of the first light beam.

The video signal processor may treat the first synchronization signal from the synchronization signal detector as a synchronization signal of the first and the third light beams and may treat the second synchronization signal from the second horizontal synchronization signal generating unit as a synchronization signal of the second and the fourth light beams.

The light scanning device may include light sources to emit first through fourth light beams, first and second light deflectors that each include a plurality of reflective surfaces, and an incidence optical system to emit the first and second light beams emitted from the light sources to different reflective surfaces of the first light deflector, and to emit the third and fourth light beams emitted from the light sources to different reflective surfaces of the second light deflector, wherein the synchronization signal detector may include a first beam detecting sensor to detect a portion of the first light beam, and a second beam detecting sensor to detect a portion of the third light beam.

The video signal processor, when the second beam detecting sensor detects the portion of the third light beam, may count a synchronization signal offset and may generate a fourth horizontal synchronization signal regarding the fourth light beam.

The video signal processor may include a central processing unit (CPU) or a hyper print video controller (HPVC).

The foregoing and/or other features and utilities of the present general inventive concept may also be achieved by providing an image forming apparatus, including a synchronization signal detector to generate a first horizontal synchronization signal based on detection of a first scanned light beam, a horizontal synchronization generating unit to receive the first horizontal synchronization signal and generate a second horizontal synchronization signal corresponding to a second scanned light beam at a time offset from the first horizontal synchronization signal, and a video controller to output video data based on the first and second horizontal synchronization signals.

The image forming apparatus may further include a light deflector including a plurality of sides to deflect and scan the first and second light beams to respective first and second scanned surfaces.

A first side of the light deflector may include an effective scanning region to reflect the first light beam to the first scanning surface, and a synchronization reflective region adjacent to the effective scanning region to reflect the first light beam as a synchronization detecting light beam to generate the first horizontal synchronization signal.

The light deflector may rotate such that a second side is exposed to the second light beam to reflect the second light beam off another effective scanning region towards the second scanned surface.

The light deflector may scan the first light beam to the first scanned surface in a first direction, and may scan the second light beam to the second scanned surface in a second direction.

The offset may be determined according to at least one of a rotating speed of the light deflector, an incident angle of the first and second light beams, a circumscribing diameter of the light deflector, a distance between a center of the light deflector and the first and second light beams incident on the light deflector, and the number of reflective surfaces of the light deflector.

The foregoing and/or other features and utilities of the present general inventive concept may also be achieved by providing a scanning method of an image forming apparatus, the method including scanning first and second light beams within a light scanning device, generating a first horizontal synchronization signal corresponding to a portion of the first scanned light beam, counting a synchronization signal offset, generating a second horizontal synchronization signal regarding the second light beam when the first horizontal synchronization signal is transmitted, and transferring video data to the light scanning device based on the first and second horizontal synchronization signals.

The foregoing and/or other features and utilities of the present general inventive concept may also be achieved by providing a scanning method of an image forming apparatus, the method including outputting a plurality of light beams, detecting a first horizontal synchronization signal corresponding to a first of the plurality of light beams, outputting first video data corresponding to the first of the plurality of light beams, generating a second horizontal synchronization signal based on the first horizontal synchronization signal and offset therefrom, and outputting second of the plurality of light video data corresponding to a second of the plurality of light beams.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
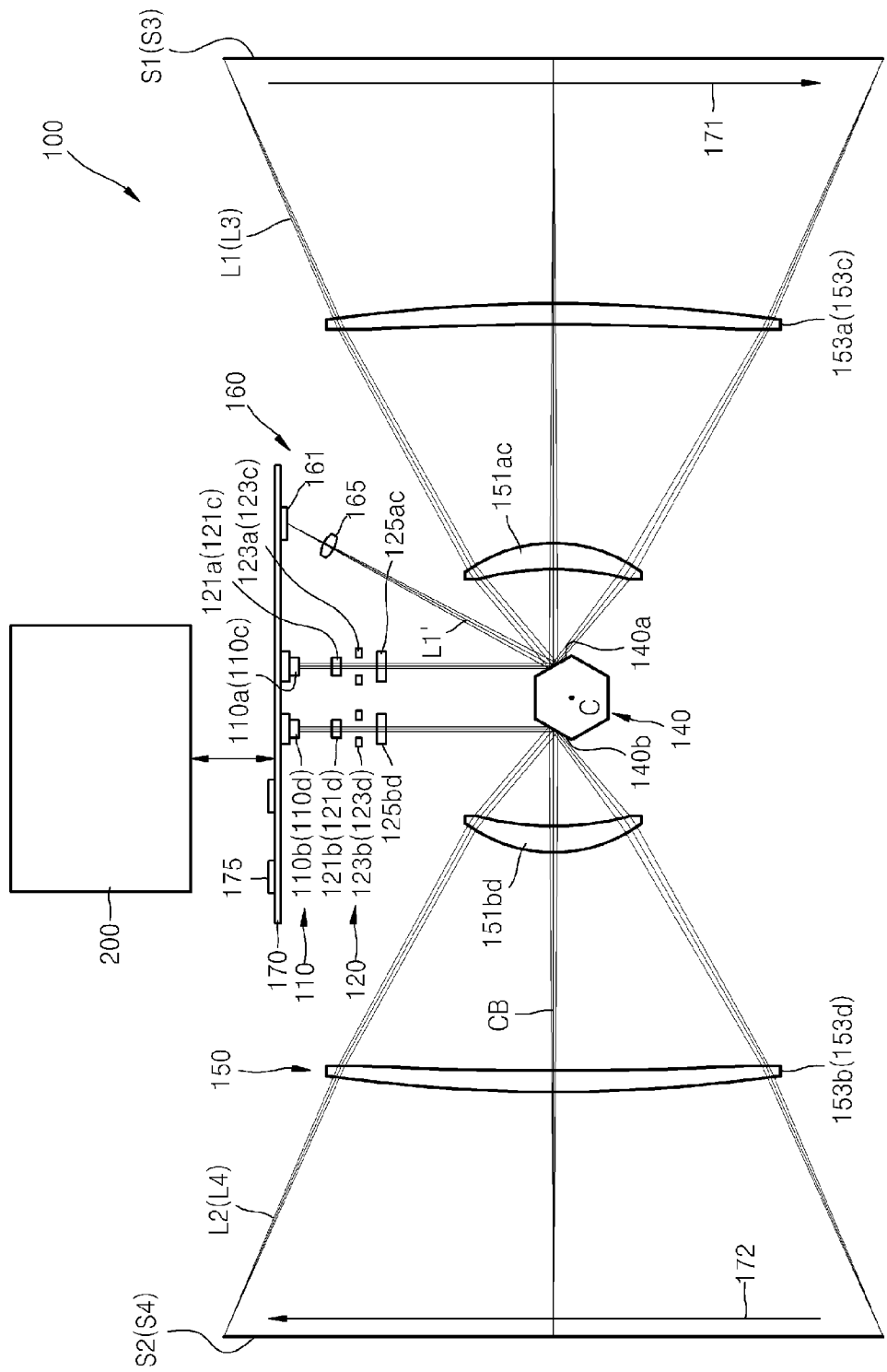
FIG. 1 is a diagram illustrating a light scanning device and a video signal processor of an electrophotographic image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. As used herein, the term "and/or" includes any and all combinations of one or more of the associated listed items. Expressions such as "at least one of," when preceding a list of elements, modify the entire list of elements and do not modify the individual elements of the list.

Throughout this specification, a main scanning direction refers to a scanning direction of a light beam that is deflected and scanned by a light deflector 140, as illustrated in FIG. 1, and a sub scanning direction refers to a direction that is perpendicular to both the main scanning direction and a proceeding direction of a light beam. The sub scanning direction is the same as a direction of a rotational axis of the light deflector 140. In addition, a main scanning plane refers to a plane across which a light beam is deflected and scanned by the light deflector 140, and a sub scanning plane refer to a plane perpendicular to the main scanning plane. Since a light path of a light beam may be changed by a light path changing member such as a reflective mirror, the main scanning direction and the sub scanning direction may be changed as the light path is changed.

Figure 2:
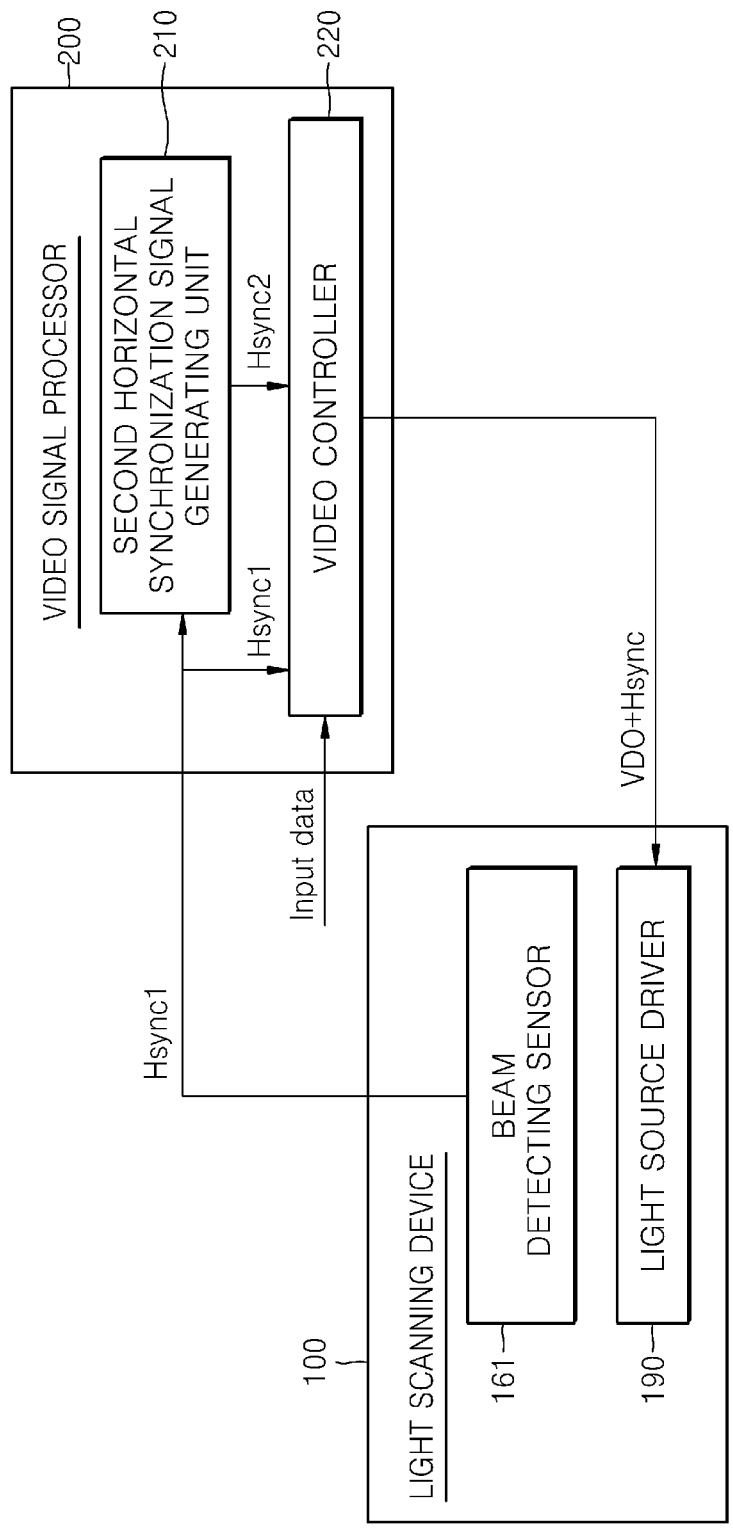
FIG. 2 is a block diagram illustrating the electrophotographic image forming apparatus of FIG. 1.
Figure 3:
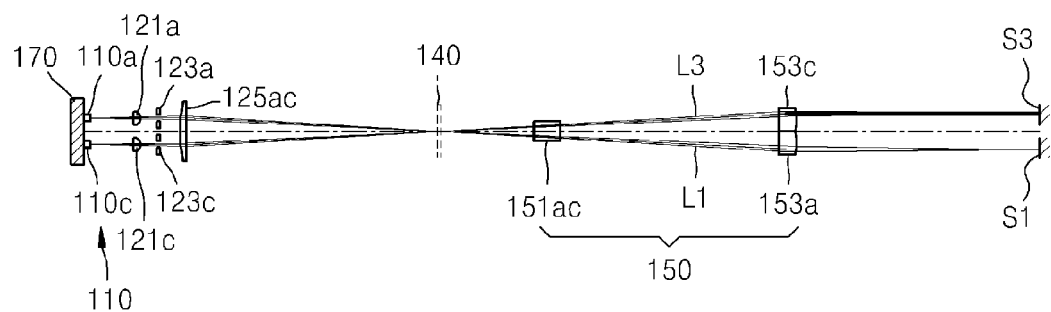
FIGS. 3 and 4 illustrate schematic optical arrangements of the light scanning device of the electrophotographic image forming apparatus of FIG. 1.
Figure 4:
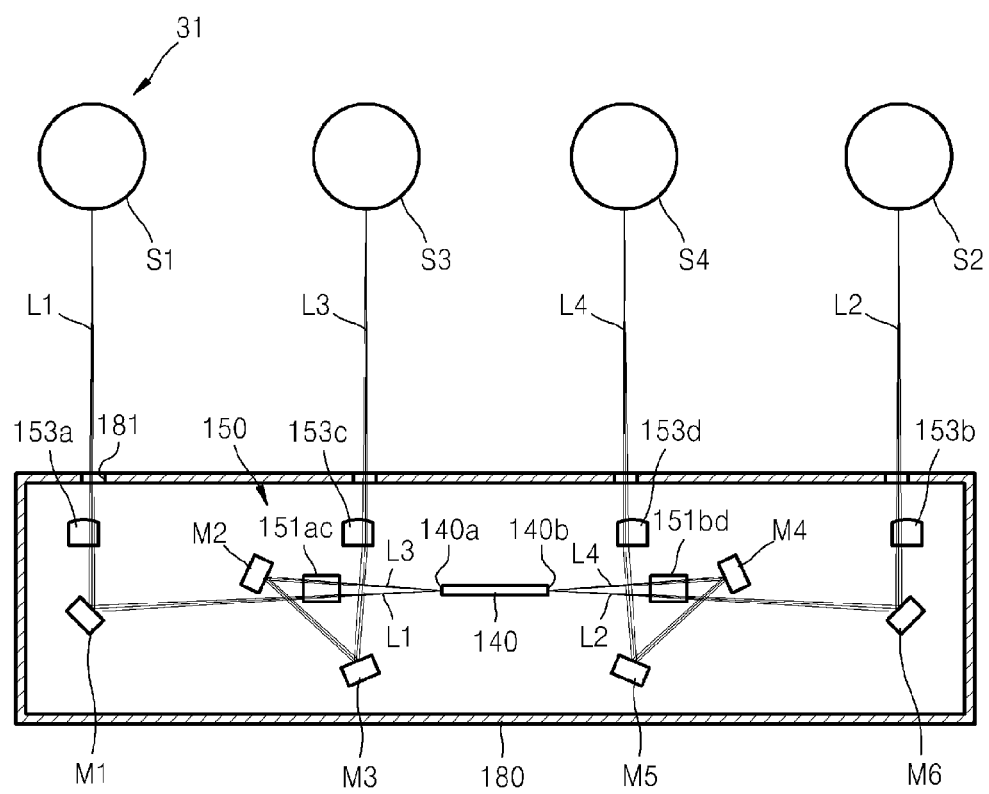

FIG. 1 is a diagram illustrating a light scanning device 100 and a video signal processor 200 of an electrophotographic image forming apparatus according to an embodiment of the present general inventive concept. FIG. 2 is a block diagram illustrating the electrophotographic image forming apparatus of FIG. 1. FIG. 1 illustrates an optical arrangement of the light scanning device 100 with respect to the main scanning plane and an optical path of an image forming optical system 150 that is not folded. FIG. 3 illustrates a schematic optical arrangement of the light scanning device 100 with respect to the sub scanning plane. More specifically, FIG. 3 illustrates the optical path of the optical system 150 of the light scanning device 100 that is not folded or deflected. FIG. 4 illustrates an arrangement of an image forming optical system 150 of the light scanning device 100, according to an embodiment of the present general inventive concept.

Referring to FIGS. 1 and 2, the image forming apparatus according to the present embodiment includes the light scanning device 100, and the video signal processor 200 to transmit video data to the light scanning device 100.

The light scanning device 100 includes a light source unit 110, the light deflector 140, and a synchronization signal detector 160.

The light source unit 110 may include first through fourth light sources 110a, 110b, 110c, and 110d. The first through fourth light sources 110a, 110b, 110c, and 110d emit first through fourth light beams L1, L2, L3, and L4 that are modulated according to image information, respectively, and may each be, for example, a semiconductor laser diode to emit a laser beam.

The first through fourth light sources 110a, 110b, 110c, and 110d are arranged in such a way that the light deflector 140 may scan the first through fourth light beams L1, L2, L3, and L4 to two sides. For example, as illustrated in FIG. 1, the first and third light sources 110a and 110c may be arranged in such a way that the first and third light beams L1 and L3 may be scanned to the right of the light deflector 140, and the second and fourth light sources 110b and 110d may be arranged in such a way that the second and fourth light beams L2 and L4 may be scanned to the left of the light deflector 140.

The first through fourth light sources 110a, 110b, 110c, and 110d may be arranged in such a way that the first through fourth light beams L1, L2, L3, and L4 may be incident in parallel to each other on the light deflector 140. Accordingly, since the first through fourth light sources 110a, 110b, 110c, and 110d are arranged in such a way that light-emitting surfaces thereof may be directed in a single direction, the first through fourth light sources 110a, 110b, 110c, and 110d may be easily installed on a single circuit board 170. Circuit devices 175 mounted on the circuit board 170 may include a light source driver 190 (refer to FIG. 1) to drive each of the first through fourth light sources 110a, 110b, 110c, and 110d. Since the light source unit 110 is installed on the single circuit board 170, the number of circuit devices 175 mounted on the circuit board 170 may be reduced, assembly of the light scanning device 100 may be easily performed, and manufacturing coats may be reduced. Arrangements of the first through fourth light sources 110a, 110b, 110c, and 110d are not limited thereto, and a substrate corresponding to the first and third light sources 110a and 110c to be installed thereon and a substrate corresponding to the second and fourth 110b and 110d to be installed thereon may be separated from each other.

The light deflector 140 is a device to deflect and scan the first through fourth light beams L1, L2, L3, and L4 to first through fourth scanned surfaces S1, S2, S3, and S4 in the main scanning direction, respectively. The light deflector 140 may be a polygonal rotating mirror that has six reflective surfaces (i.e., a hexagon mirror), which is rotated at a constant speed by a driver (not illustrated) such as a spindle motor.

When the light deflector 140 rotates clockwise, the first and third light beams L1 and L3 may be reflected off a first reflective surface 140a of the light deflector 140 and then may be scanned to the first and third scanned surfaces S1 and S3 in a first direction 171. In addition, the second and fourth light beams L2 and L4 may be reflected off a second reflective surface 140b of the light deflector 140 and may be scanned to the second and fourth scanned surfaces S2 and S4 in a second direction 172, which is a direction opposite from the first direction 171. That is, the first and third light beams L1 and L3, and the second and fourth light beams L2 and L4 are antisymmetrically scanned with respect to the light deflector 140. Here, the first reflective surface 140a of the light deflector 140 is any reflective surface on which the first and third light beams L1 and L3 are incident, rather than being any particular reflective surface. Also, the second reflective surface 140b is any reflective surface on which the second and fourth light beams L2 and L4 are incident, rather than being any particular reflective surface.

As illustrated in FIG. 3, the first and third light sources 110a and 110c may be disposed in parallel to the sub scanning direction. Furthermore, the second and fourth light sources 110b and 110d are also disposed in parallel to the sub scanning direction. Although FIG. 1 appears to illustrate the first and third light sources 110a and 110c, as well as the second and fourth light sources 110b and 110d, as being overlapped, FIG. 3 more clearly illustrates that first and third light sources 110a and 110c, for example, are not overlapped but disposed next to each other. As illustrated in FIG. 3, the first and third light beams L1 and L3 may be incident at different angles on the first reflective surface 140a of the light deflector 140 in the sub scanning direction. The second and fourth light beams L2 and L4 may be incident at different angles on the second reflective surface 140b of the light deflector 140 in the sub scanning direction. If necessary, the first and third light beams L1 and L3 may be incident in parallel to each other on the first reflective surface 140a of the light deflector 140, and also, the second and fourth light beams L2 and L4 may be incident in parallel to each other on the second reflective surface 140b of the light deflector 140.

An incidence optical system 120 may be disposed on light paths of the first through fourth light beams L1, L2, L3, and L4 between the light source unit 110 and the light deflector 140. The incidence optical system 120 may include at least one of collimating lenses 121a, 121b, 121c, and 121d, cylindrical lenses 125ac and 125bd, and slits 123a, 123b, 123c, and 123d. The collimating lenses 121a, 121b, 121c, and 121d may each be a condenser lens that converts one of the first through fourth light beams L1, L2, L3, and L4 emitted from the light source unit 110 into parallel light or convergent light. The cylindrical lenses 125ac and 125bd may each be an anamorphic lens that linearly forms an image on a reflective surface of the light deflector 140 by focusing one of the first through fourth light beams L1, L2, L3, and L4 in a direction corresponding to the main scanning direction and/or the sub scanning direction. In this case, as illustrated in FIG. 3, the first light beam L1 and the third light beam L3 may be incident on the light deflector 140 while being adjacent to each other and spaced a predetermined interval apart from each other in the sub scanning direction, and thus, the single cylindrical lens 125ac may be shared by the first light beam L1 and the third light beam L3. Also, the single cylindrical lens 125bd may be shared by the second light beam L2 and the forth light beam L4. If necessary, cylindrical lenses may be disposed on the light paths of the first through fourth light beams L1, L2, L3, and L4, respectively. The slits 123a, 123b, 123c, and 123d adjust diameters and shapes of the first through fourth light beams L1, L2, L3, and L4.

The image forming optical system 150 is a scanning optical member having a condensing function and fθ characteristics, and focuses the first through fourth light beams L1, L2, L3, and L4 deflected by the light deflector 140 on the first through fourth scanned surfaces S1, S2, S3, and S4, respectively, to form images on photosensitive drums 31, as illustrated in FIG. 4. The image forming optical system 150 may include a first group of image forming optical lenses 151ac and 151bd, and a second group of image forming optical lenses 153a, 153b, 153c, and 153d. The first group of image forming optical lenses 151ac and 151bd, and the second group of image forming optical lenses 153a, 153b, 153c, and 153d may each be, for example, a toric lens having two toric shaped surfaces. As described above, the first light beam L1 and the third light beam L3 approach each other around the light deflector 140, and thus, the image forming optical lens 151ac adjacent to the light deflector 140 may be shared by the first light beam L1 and the third light beam L3 after the first light beam L1 and the third light beam L3 are reflected by the light deflector 140. Also, the image forming optical lens 151cd may be shared by the second light beam L2 and the fourth light beam L4 after the second light beam L2 and the fourth light beam L4 are deflected by the light deflector 140. If necessary, image forming optical lenses may be disposed on the light paths of the first through fourth light beams L1, L2, L3, and L4, respectively. Furthermore, referring to FIG. 3, in the image forming optical system 150, two lenses are disposed on each of the light paths of the first through fourth light beams L1, L2, L3, and L4, but the present general inventive concept is not limited thereto. Thus, an optical configuration of the image forming optical system 150 may be changed in various ways. For example, the image forming optical system 150 may be configured by disposing one lens or three or more lenses on each of the light paths of the first through fourth light beams L1, L2, L3, and L4.

FIG. 4 illustrates an arrangement of the image forming optical system 150 of the light scanning device 100, according to an embodiment of the present general inventive concept. Optical components included in the light scanning device 100 are encapsulated in a housing 180. The first through fourth light beams L1, L2, L3, and L4 are scanned out of the housing 180 through windows 181. The light scanning device 100 is included in the image forming apparatus, as will be described below, and scans the first through fourth light beams L1, L2, L3, and L4 to the photosensitive drums 31 having one of the first through fourth scanned surfaces S1, S2, S3, and S4. Since positions of the photosensitive drums 31 may be limited due to an arrangement of instruments of the image forming apparatus, by appropriately designing the image forming apparatus, the light paths of the first through fourth light beams L1, L2, L3, and L4 in the image forming optical system 150 may be adjusted by using mirrors M1, M2, M3, M4, M5, and M6 so as to correspond to an arrangement of the photosensitive drums 31.

Referring back to FIG. 1, the synchronization signal detector 160 includes a single beam detecting sensor 161. The beam detecting sensor 161 may be, for example, a photo diode or a photo sensor integrated circuit (IC), but is not limited thereto.

The beam detecting sensor 161 may be disposed on a portion of the circuit board 170 towards which a first light beam L1' (hereinafter, referred to as a synchronization detecting light beam L1') is directed to detect a start point of one scanning period of the first light beam L1 scanned by the light deflector 140, such that the synchronization detecting light beam L1' is directed to a point just before the start point of one effective scanning period of the first light beam L1 reflected off the first reflective surface 140a of the light deflector 140. The synchronization detecting light beam L1' detected by the beam detecting sensor 161 is converted into a horizontal synchronization signal (hereinafter, referred to as a first horizontal synchronization signal) indicating a beginning of scanning of the first light beam L1. As described above, with respect to the main scanning plane, the third light beam L3 is incident and scanned together with the first light beam L1 on the light deflector 140, and thus, the third light beam L3 is in synchronization with the first light beam L1. That is, the first horizontal synchronization signal detected by the beam detecting sensor 161 may be treated as a horizontal synchronization signal of the third light beam L3.

Referring to FIG. 4, since the single beam detecting sensor 161 corresponds to the single light deflector 140 and the single beam detecting sensor 161 processes a synchronization signal regarding the first through fourth light beams L1, L2, L3, and L4, a structure of the synchronization signal detector 160 is simplified, thereby reducing material costs and error rates. Conventionally, when a light scanning device includes a plurality of beam detecting sensors, sensitivities of the beam detecting sensors may be differently changed due to a change in temperature, or detection surfaces of the beam detecting sensors may be non-uniformly changed (e.g., contaminated). Thus, synchronization signal detecting timings of the beam detecting sensors may become slightly different from each other, and image quality may deteriorate. However, according to the present general inventive concept, since the synchronization signal detector 160 includes the single beam detecting sensor 161, problems that may occur when a plurality of beam detecting sensors are used may be overcome.

As illustrated in FIG. 1, since the synchronization detecting light beam L1' is directed towards a point adjacent to the first light source 110a, the beam detecting sensor 161 may be installed together with the light source unit 110 on the single circuit board 170. Thus, since the light source unit 110 and the beam detecting sensor 161 are installed together on the single circuit board 170, the number of components within the image forming apparatus may be reduced, thereby reducing manufacturing costs and simplifying assembly of the image forming apparatus. Alternatively, the beam detecting sensor 161 and the light source unit 110 may be installed on separate respective circuit boards.

A synchronization detecting lens 165 to focus the synchronization detecting light beam L1' on the beam detecting sensor 161 may be interposed between the beam detecting sensor 161 and the light deflector 140. If necessary, a light path change member (e.g., a mirror) (not illustrated) may be disposed on a light path of the synchronization detecting light beam L1'. When the light path change member is present, the beam detecting sensor 161 may be freely disposed without being installed on a circuit board.

The first horizontal synchronization signal detected by the beam detecting sensor 161 is A/D converted, and is transferred to the video signal processor 200.

Referring to FIG. 2, the video signal processor 200 includes a second horizontal synchronization signal generating unit 210 and a video controller 220. The video signal processor 200 may be a central processing unit (CPU) installed in a main board of the image forming apparatus or a hyper print video controller (HPVC).

The second horizontal synchronization signal generating unit 210 receives a first horizontal synchronization signal Hsync1 transmitted from the beam detecting sensor 161, and generates a second horizontal synchronization signal Hsync2. The second horizontal synchronization signal generated by the second horizontal synchronization signal generating unit 210 may be treated as a horizontal synchronization signal of both of the second light beam L2 and the fourth light beam L4.

Figure 5:
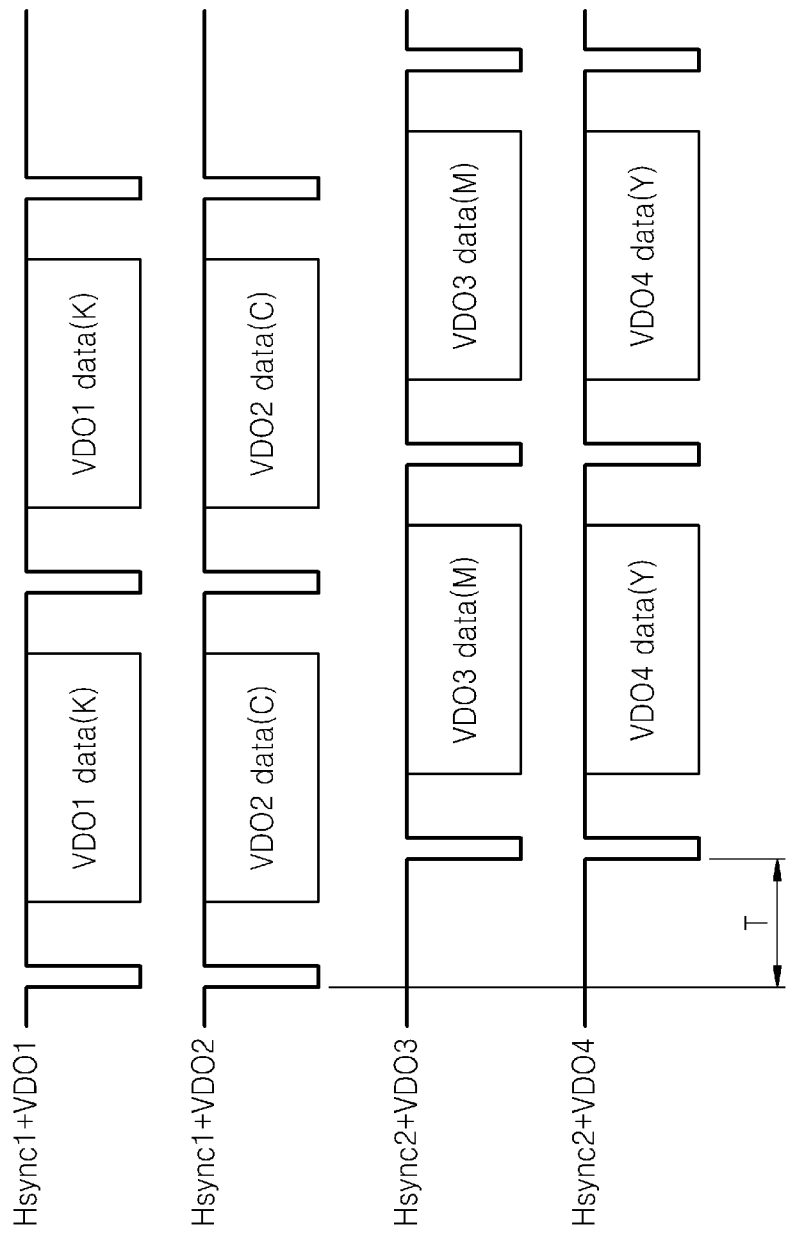
FIG. 5 is a timing diagram corresponding to a method of processing a horizontal synchronization signal, according to an embodiment of the present general inventive concept.

FIG. 5 is a timing diagram corresponding to a method of processing a horizontal synchronization signal, according to an embodiment of the present general inventive concept. Referring to FIG. 5, the video controller 220 transmits first through fourth video data VDO1, VDO2, VDO3, and VDO4 to the light source driver 190 according to the first horizontal synchronization signal Hsync 1 generated by the beam detecting sensor 161 and the second horizontal synchronization signal Hsync2 generated by the second horizontal synchronization signal generating unit 210. The first through fourth video data VDO1, VDO2, VDO3, and VDO4 may be video data corresponding to, for example, black (K), cyan (C), magenta (M), and yellow (Y). The light source driver 190 controls the first through fourth light sources 110a, 110b, 110c, and 110d, as illustrated in FIG. 1, according to the first through fourth video data VDO1, VDO2, VDO3, and VDO4 transmitted from the video controller 220 in synchronization with the first and second horizontal synchronization signals Hsync1 and Hsync2, respectively, so as to emit the first through fourth light beams L1, L2, L3, and L4. As a result, the second horizontal synchronization signal Hsync2 and the first horizontal synchronization signal Hsync1 may be generated with a time difference T. The time difference T may be a synchronization signal offset that is counted based on the first horizontal synchronization signal Hsync1 in order to generate the second horizontal synchronization signal Hsync2.

Figure 6A:
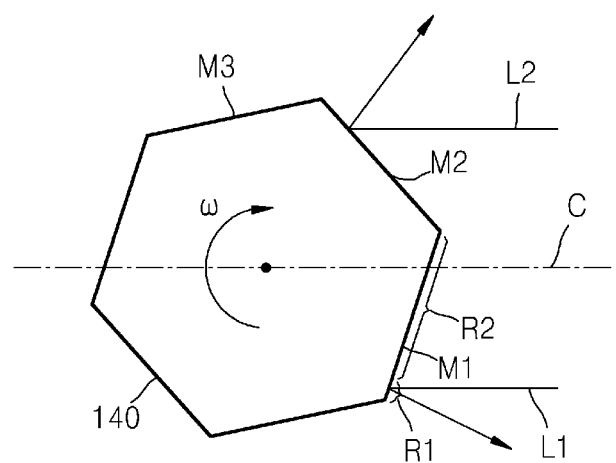
FIGS. 6A through 6C are diagrams illustrating scanning of a light beam according to rotation of a polygonal rotating mirror.
Figure 6B:
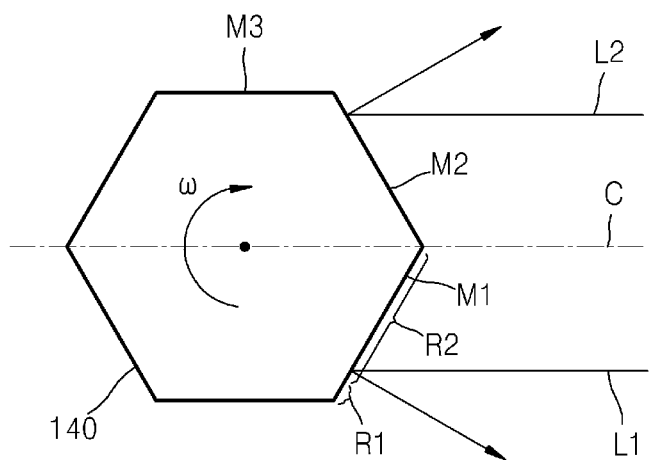
Figure 6C:
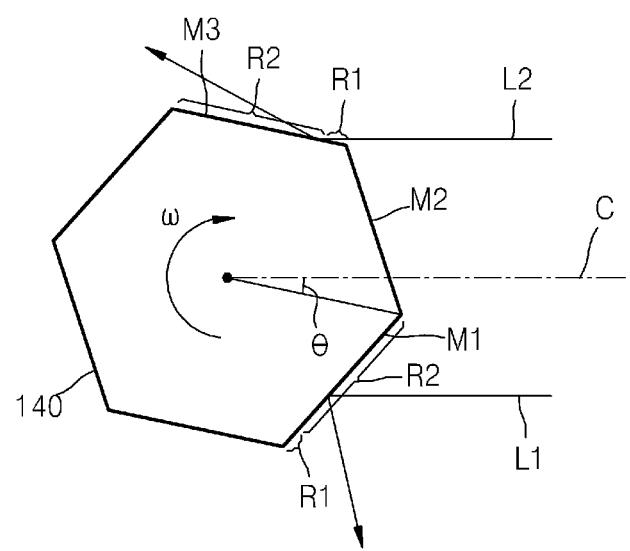

FIGS. 6A through 6C are diagrams illustrating a synchronization signal offset, and illustrates a light path of a light beam that is scanned according to a rotation of a polygonal rotating mirror. In FIGS. 6A through 6C, the light deflector 140 rotates clockwise at an angular speed w. Reflective surfaces (e.g., M1 or M3) of the light deflector 140 may each be divided into an effective scanning region R2 and a synchronization reflective region R1 that is adjacent to a start point of the effective scanning region R2. In this case, each of the reflective surfaces M1 and M3 includes any reflective surface on which the first or second light beam L1 or L2, respectively, is incident, rather than being any particular reflective surface.

Referring to FIG. 6A, the first light beam L1 is incident on the synchronization reflective region R1 of a first reflective surface M1 of the light deflector 140, and the second light beam L2 is incident on a second reflective surface M2. The first light beam L1 reflected off the synchronization reflective region R1 is the synchronization detecting light beam L1, is incident on the beam detecting sensor 161, and generates the first horizontal synchronization signal. Referring to FIG. 6B, when the light deflector 140 slightly rotates clockwise, the start point of the effective scanning region R2 of the first reflective surface M1 is moved to a point to which the first light beam L1 is irradiated, and the first light beam L1 is reflected off the effective scanning region R2 and proceeds towards the first scanned surface S1, as illustrated in FIG. 1. In FIG. 6B, the second light beam L2 is not effectively scanned. FIG. 6C illustrates the light deflector 140 as it rotates clockwise by an angle θ so that the start point of the effective scanning region R2 of a third reflective surface M3 is moved to a point to which the second light beam L2 is irradiated. The second light beam L2 is reflected off the effective scanning region R2 of the third reflective surface M3 and proceeds towards the second scanned surface S2, as illustrated in FIG. 1.

FIG. 6B illustrates the first light beam L1 as it starts to be effectively scanned, and FIG. 6C illustrates the second light beam L2 as it starts to be effectively scanned, in which a time $\theta/\Omega$ is a time difference between scanning of the first light beam L1 and scanning of the second light beam L2, and corresponds to the imaginary synchronization signal offset T, as illustrated in FIG. 5, between the second horizontal synchronization signal Hsync2 and the first horizontal synchronization signal Hsync1. The angle θ may be determined according to design factors related to a geometrical arrangement, such as a circumscribing diameter of the light deflector 140, a number of reflective surfaces of the light deflector 140, an incident angle of the first and second light beams L1 and L2 with respect to the light deflector 140, and a distance between a center C, as illustrated in FIG. 1, of the light deflector 140 and the first and second light beams L1 and L2. Thus, the synchronization signal offset T may be determined according to the angular speed Ω and geometrical design factors based on the light deflector 140.

Figure 7:
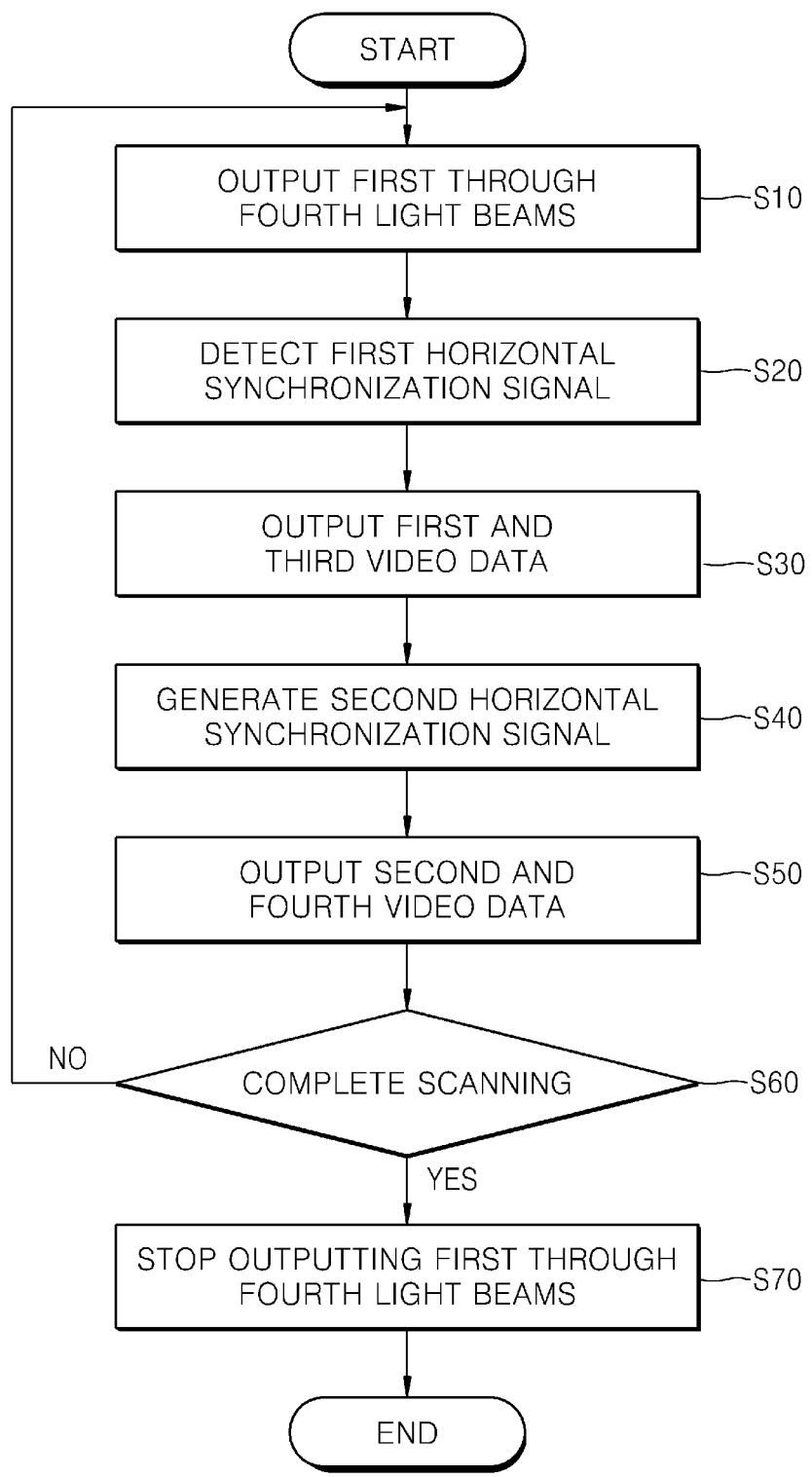
FIG. 7 is a flowchart illustrating a method of processing a horizontal synchronization signal, according to an embodiment of the present general inventive concept.

An operation of the image forming apparatus will be described with reference to FIGS. 1, 2, and 7.

When a printing command is input to the video signal processor 200 of the image forming apparatus, a motor (not illustrated) to drive the light deflector 140 of the light scanning device 100 is driven to check a state of the motor. When the motor of the light deflector 140 is normally driven, the video signal processor 200 enables a power supply signal of the light source unit 110 and enables a sample and hold signal so that the light source unit 110 may output the first through fourth light beams L1, L2, L3, and L4 (operation S10). The first through fourth light beams L1, L2, L3, and L4 are deflected by the light deflector 140 and are scanned to the first through fourth scanned surfaces S1, S2, S3 and S4. Accordingly, the synchronization detecting light beam L1 corresponding to a start point of scanning of the first light beam L1 proceeds towards the beam detecting sensor 161, and the beam detecting sensor 161 detects the first horizontal synchronization signal Hsync1 (operation S20). The first horizontal synchronization signal Hsync1 is input to the second horizontal synchronization signal generating unit 210 and the video controller 220 of the video signal processor 200. The video controller 220 transmits first and third video data to the light source driver 190 based on the first horizontal synchronization signal Hsync1 (operation S30). The light source driver 190 drives the first and third light sources 110a and 110c according to the first and third video data. When the first horizontal synchronization signal Hsync1 is input to the second horizontal synchronization signal generating unit 210, the second horizontal synchronization signal generating unit 210 generates the second horizontal synchronization signal Hsync2 with a predetermined offset and inputs the predetermined offset to the video controller 220 (operation S40). The video controller 220 transmits second and fourth video data to the light source driver 190 based on the second horizontal synchronization signal Hsync2 (operation S50). The light source driver 190 drives the second and fourth light sources 110b and 110d according to the second and fourth video data. Such operations are repeatedly performed until scanning is completely performed (operation S60). When scanning is completely performed, output of the first through fourth light beams L1, L2, L3, and L4 is stopped (operation S70).

FIGS. 1, and 6A through 6C illustrate the light deflector 140 including six reflective surfaces, but the present general inventive concept is not limited thereto. When the light deflector 140 includes five or more reflective surfaces, and the first through fourth light sources 110a, 110b, 110c, and 110d are arranged in such a way that the first through fourth light beams L1, L2, L3, and L4 are scanned in parallel to each other, start points of scanning of a plurality of light beams (e.g., the first light beam L1 and the second light beam L2) that are deflected and scanned by different reflective surfaces may be different. Thus, by calculating the second horizontal synchronization signal Hsync2 by using the method according to the present embodiment, the single beam detecting sensor 161 may obtain horizontal synchronization signals regarding the first through fourth light beams L1, L2, L3, and L4.

Figure 8:
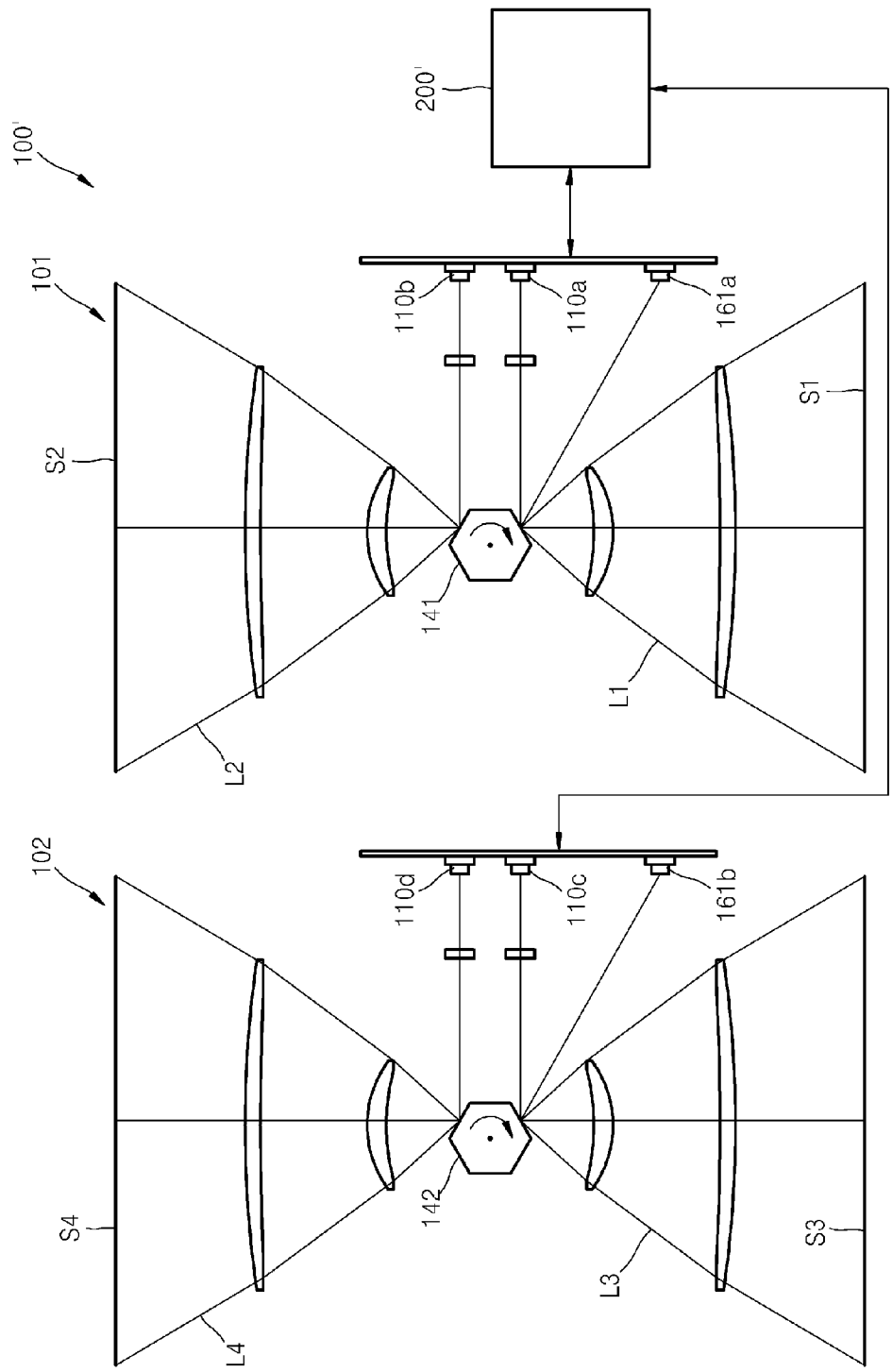
FIG. 8 is a structural view illustrating an image forming apparatus according to another embodiment of the present general inventive concept.

FIG. 8 is a structural view illustrating an image forming apparatus according to another embodiment of the present general inventive concept.

Referring to FIG. 8, the image forming apparatus according to the present embodiment includes a light scanning device 100' including first and second sub light scanning modules 101 and 102, respectively, and a video signal processor 200' to transmit video data to the light scanning device 100'.

The first sub light scanning module 101 scans the first and second light beams L1 and L2 by using a single light deflector 141. The second sub light scanning module 102 scans the third and fourth light beams L3 and L4 by using a single light deflector 142. In FIG. 1, since the single light deflector 140 scans four light beams, that is, the first through fourth light beams L1, L2, L3 and L4, by using the single light deflector, only a single sensor, that is, the beam detecting sensor 161, is required. However, in FIG. 8, since two light deflectors 141 and 142 scan the first and second light beams L1 and L2, and the third and fourth light beams L3 and L4, respectively, two beam detecting sensors 161a and 161b are required.

The first sub light scanning module 101 is substantially the same as the light scanning device 100, except that the first sub light scanning module 101 does not include the third and fourth light sources 110c and 110d and optical components related thereto. The second sub light scanning module 102 is substantially the same as the first sub light scanning module 101, except that the second sub light scanning module 102 scans the third and fourth light beams L3 and L4 instead of the first and second light beams L1 and L2. Thus, a detailed description of the first and second sub light scanning modules 101 and 102 will be omitted.

When a horizontal synchronization signal regarding the first light beam L1 detected by the first sub light scanning module 101 is input to the video signal processor 200', the video signal processor 200' counts a synchronization signal offset, generates an imaginary horizontal synchronization signal regarding the second light beam L2, and transmits to the light scanning device 100' corresponding video data based on the horizontal synchronization signal regarding the first light beam L1 and the imaginary synchronization signal regarding the second light beam L2. As descried above, the synchronization signal offset may be determined according to design factors related to a geometrical arrangement, such as a circumscribing diameter of the light deflector 141, the number of reflective surfaces of the light deflector 141, an incident angle of the first and second light beams L1 and L2 with respect to the light deflector 141, and a distance between a center of the light deflector 141 and the first and second light beams L1 and L2, and an angular speed of the light deflector 141. When a horizontal synchronization signal regarding the third light beam L3 detected by the second sub light scanning module 102 is input to the video signal processor 200', the video signal processor 200' counts a synchronization signal offset, generates an imaginary horizontal synchronization signal regarding the fourth light beam L4, and transmits to the light scanning device 100' corresponding video data based on the horizontal synchronization signal regarding the third light beam L3 and the imaginary horizontal synchronization signal regarding the fourth light beam L4.

Figure 9:
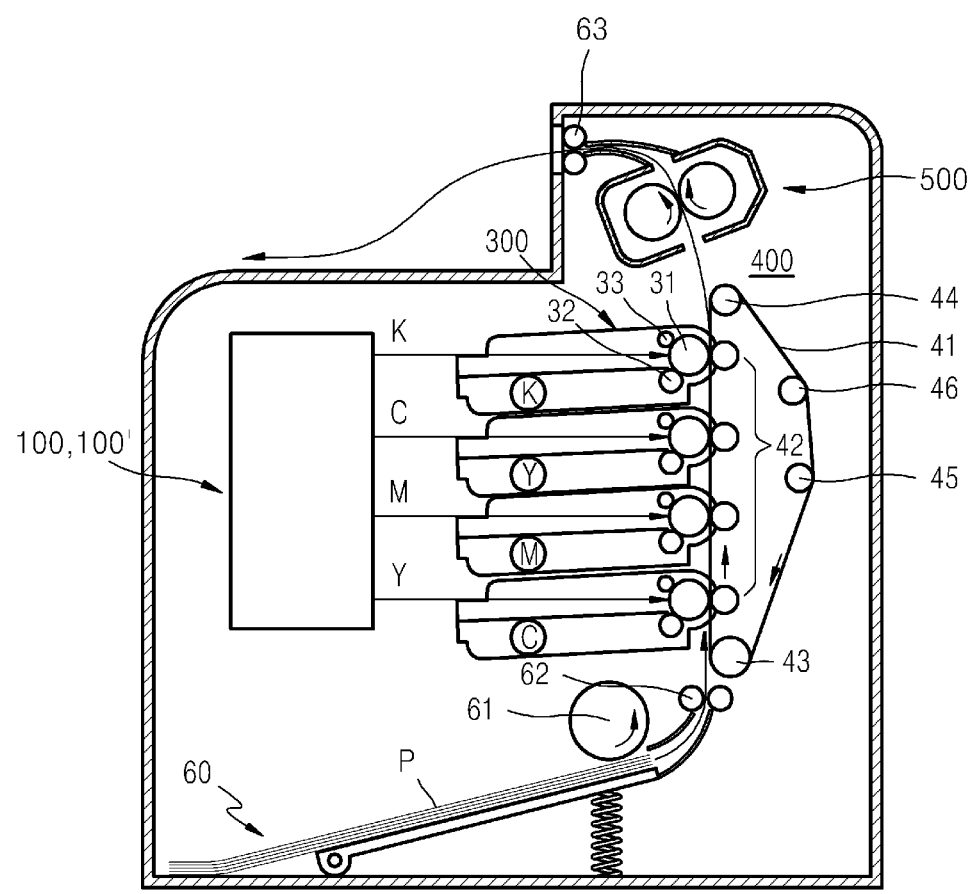
FIG. 9 is a diagram illustrating an image forming apparatus according to another embodiment of the present general inventive concept.

Referring to FIG. 9, an image forming apparatus according to another embodiment of the present general inventive concept includes the light scanning devices 100 and 100', develop devices 300, a transfer device 400, and a fixing device 500.

The light scanning devices 100 and 100' represent the light scanning device 100 or 100' of FIG. 1 or 8, respectively. In order to print color images, the light scanning devices 100 and 100' scan a plurality of light beams. That is, as described with reference to FIGS. 1 through 8, the light scanning devices 100 and 100' may scan light beams corresponding to black (K), cyan (C), magenta (M), and yellow (Y) through the single light deflector 140, as illustrated in FIG. 1, or the two light deflectors 141 and 142, as illustrated in FIG. 8, and the develop devices 300 may be provided for black (K), cyan (C), magenta (M), and yellow (Y) color printing, respectively. As described with reference to FIGS. 1 through 8, the light scanning devices 100 and 100' reduce a number of beam detecting sensors within the image forming apparatus. For example, the light scanning devices 100 and 100' uses only the beam detecting sensor 161 of FIG. 1, or the beam detecting sensors 161a and 161b of FIG. 8, thereby obtaining a compact structure.

The develop devices 300 may correspond to a plurality of light beams and may be provided to correspond to respective colors, and may be arranged in tandem to each other. The develop devices 300 includes the photosensitive drums 31, which are each an image receptor on which an electrostatic latent image is formed, and develop rollers 32 to develop the electrostatic latent image.

The photosensitive drums 31 are each an example of a photosensitive medium, and each is formed by forming a photosensitive layer on an outer circumference surface of a cylindrical metal pipe to a predetermined thickness. Although not illustrated, a photosensitive belt having a belt shape may be used as a photosensitive medium. Outer circumference surfaces of the photosensitive drums 31 correspond to the first through fourth scanned surfaces S1, S2, S3 and S4, as illustrated in FIGS. 1 and 8). A charging roller 33 is positioned near a region upstream from a portion of the outer circumference surface of each photosensitive drum 31 exposed by the light scanning devices 100 and 100' with respect to a rotation direction of the photosensitive drums 31. The charging roller 33 is an example of a charger to charge surfaces of the photosensitive drums 31 while contacting the photosensitive drums 31 and rotating against the photosensitive drums 31. A charging bias is applied to the charging roller 33. A corona charger (not illustrated) may be used instead of the charging roller 33.

The develop rollers 32 supply toner attached to outer circumference surfaces thereof to the photosensitive drums 31. A developing bias to supply the toner to the photosensitive drums 31 is applied to the develop rollers 32. Although not illustrated, each of the develop devices 300 may further include a supply roller to attach toner accommodated therein to the develop rollers 32, a regulator to regulate an amount of the toner attached to the develop rollers 32, a supply roller to supply the toner, and/or a stirrer to move the toner towards the develop rollers 32.

The transfer device 400 may include a paper transferring belt 41 and four transfer rollers 42. The paper transferring belt 41 faces a portion of the outer circumference surfaces of the photosensitive drums 31, which are exposed out of the develop devices 300. The paper transferring belt 41 is supported by a plurality of support rollers 43, 44, 45 and 46, and is circulated. The four transfer rollers 42 face the photosensitive drums 31 of the develop devices 300, such that the paper transferring belt 41 is disposed between the four transfer rollers 42 and the photosensitive drums 31. A transfer bias is applied to the transfer rollers 42.

A process of forming a color image by using the above-described structure is described below.

The photosensitive drums 31 of the develop devices 300 are charged with uniform potential by a charging bias applied to the charging rollers 33. The light scanning devices 100 and 100' scans four light beams corresponding to image information of black (K), cyan (C), magenta (M), and yellow (Y) to the photosensitive drums 31 of the develop devices 300 to form electrostatic latent images thereupon. A develop bias is applied to the develop rollers 32. Then, the toner attached to the outer circumference surfaces of the develop rollers 32 is attached to the electrostatic latent images to form toner images of black (K), cyan (C), magenta (M), and yellow (Y) on the photosensitive drums 31 of the develop devices 300.

A medium that receives the toner, for example, a sheet of printing paper P, is extracted out from a cassette 60 by a pickup roller 61. The printing paper P is placed on the paper transferring belt 41 by a moving roller 62. The sheet of printing paper P is attached to a surface of the paper transferring belt 41 by an electrostatic force, and is moved at a same speed as a linear speed of the paper transferring belt 41.

For example, at a moment when a front end of the toner image of cyan (C) formed on the outer circumference surface of the photosensitive drum 31 of the develop device 300 corresponding to cyan (C) reaches a transfer nip facing the transfer roller 42 corresponding to the photosensitive drum 31, a front end of the sheet of printing paper P reaches the transfer nip. When a transfer bias is applied to the transfer roller 42, the toner image formed on the photosensitive drum 31 is transferred onto the sheet of printing paper P. As the printing paper P is moved, the toner images of black (K), cyan (C), magenta (M), and yellow (Y) formed on the photosensitive drums 31 of the develop devices 300 are sequentially transferred onto the sheet of printing paper P and overlap with each other, thereby forming a color toner image on the sheet of printing paper P.

The color toner image transferred onto the sheet of printing paper P is maintained on a surface of the sheet of printing paper P by an electrostatic force. The fixing device 500 fixes the color toner image on the sheet of printing paper P by using heat and pressure. The sheet of printing paper P is extended out of the image forming apparatus by an ejection roller 63.

In the above-described image forming apparatus, since a single polygonal rotating mirror uses a single beam detecting sensor, material costs and errors may be reduced. Furthermore, since a single polygonal rotating mirror uses a single beam detecting sensor, problems such as synchronization signal detecting timings of the beam detecting sensors becoming slightly different from each other, and image quality deterioration may be overcome.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   a light scanning device to scan first and second light beams;
   a synchronization signal detector to receive a portion of the first light beam scanned by the light scanning device and to generate a first horizontal synchronization signal; and
   a video signal processor, comprising:
   a second horizontal synchronization signal generating unit to count a synchronization signal offset and generate a second horizontal synchronization signal regarding the second light beam when the first horizontal synchronization signal is transmitted from the synchronization signal detector, and
   a video controller to transfer video data to the light scanning device based on the first and second horizontal synchronization signals.

2. The image forming apparatus of claim 1, wherein the synchronization signal offset is determined according to a geometrical arrangement of the first and second light beams in the light scanning device.

3. The image forming apparatus of claim 1, wherein the light scanning device comprises:
   light sources to emit the first and second light beams;
   a light deflector comprising a plurality of reflective surfaces; and
   an incidence optical system to emit the first and second light beams emitted from the light sources to different reflective surfaces of the light deflector.

4. The image forming apparatus of claim 3, wherein the light deflector comprises a polygonal rotating mirror.

5. The image forming apparatus of claim 4, wherein the light deflector comprises at least five reflective surfaces.

6. The image forming apparatus of claim 4, wherein the synchronization signal offset is determined according to at least one factor selected from the group consisting of a rotating speed of the light deflector, an incident angle of the first and second light beams, a circumscribing diameter of the light deflector, a distance between a center of the light deflector and the first and second light beams incident on the light deflector, and the number of reflective surfaces of the light deflector.

7. The image forming apparatus of claim 3, wherein the light sources and the incidence optical system are arranged in such a way that the first and second light beams are scanned to two sides with respect to a center of the light deflector.

8. The image forming apparatus of claim 3, wherein the synchronization signal detector comprises beam detecting sensors, wherein the number of the beam detecting sensors is the same as the number of light deflectors of the light scanning device.

9. The image forming apparatus of claim 1, wherein the light scanning device comprises:
light sources to emit first through fourth light beams;
a single light deflector comprising a plurality of reflective surfaces; and
an incidence optical system to emit the first and third light beams emitted from the light sources to a first reflective surface of the single light deflector, and to emit the second and fourth light beams emitted from the light sources to a second reflective surface of the single light deflector,
wherein the synchronization signal detector comprises a single beam detecting sensor to receive a portion of the first light beam.

10. The image forming apparatus of claim 9, wherein the video signal processor treats the first synchronization signal from the synchronization signal detector as a synchronization signal of the first and the third light beams and treats the second synchronization signal from the second horizontal synchronization signal generating unit as a synchronization signal of the second and the fourth light beams.

11. The image forming apparatus of claim 1, wherein the light scanning device comprises:
light sources to emit first through fourth light beams;
first and second light deflectors that each comprise a plurality of reflective surfaces; and
an incidence optical system to emit the first and second light beams emitted from the light sources to different reflective surfaces of the first light deflector, and to emit the third and fourth light beams emitted from the light sources to different reflective surfaces of the second light deflector,
wherein the synchronization signal detector comprises:
a first beam detecting sensor to detect a portion of the first light beam, and
a second beam detecting sensor to detect a portion of the third light beam.

12. The image forming apparatus of claim 11, wherein the video signal processor, when the second beam detecting sensor detects the portion of the third light beam, counts a synchronization signal offset and generates a fourth horizontal synchronization signal regarding the fourth light beam.

13. The image forming apparatus of claim 1, wherein the video signal processor comprises a central processing unit (CPU) or a hyper print video controller (HPVC).

14. An image forming apparatus, comprising:
a synchronization signal detector to generate a first horizontal synchronization signal based on detection of a first scanned light beam;
a horizontal synchronization generating unit to receive the first horizontal synchronization signal and generate a second horizontal synchronization signal corresponding to a second scanned light beam at a time offset from the first horizontal synchronization signal; and
a video controller to output video data based on the first and second horizontal synchronization signals.

15. The image forming apparatus of claim 14, further comprising:
a light deflector comprising a plurality of sides to deflect and scan the first and second light beams to respective first and second scanned surfaces.

16. The image forming apparatus of claim 15, wherein a first side of the light deflector comprises:
an effective scanning region to reflect the first light beam to the first scanning surface; and
a synchronization reflective region adjacent to the effective scanning region to reflect the first light beam as a synchronization detecting light beam to generate the first horizontal synchronization signal.

17. The image forming apparatus of claim 16, wherein the light deflector rotates such that a second side is exposed to the light beam to reflect the second light beam off another effective scanning region towards the second scanned surface.

18. The image forming apparatus of claim 15, wherein the light deflector scans the first light beam to the first scanned surface in a first direction, and scans the second light beam to the second scanned surface in a second direction.

19. The image forming apparatus of claim 15, wherein the offset is determined according to at least one of a rotating speed of the light deflector, an incident angle of the first and second light beams, a circumscribing diameter of the light deflector, a distance between a center of the light deflector and the first and second light beams incident on the light deflector, and the number of reflective surfaces of the light deflector.

20. A scanning method of an image forming apparatus, the method comprising:
scanning first and second light beams within a light scanning device;
generating a first horizontal synchronization signal corresponding to a portion of the first scanned light beam;
counting a synchronization signal offset;
generating a second horizontal synchronization signal regarding the second light beam when the first horizontal synchronization signal is transmitted; and
transferring video data to the light scanning device based on the first and second horizontal synchronization signals.

21. A scanning method of an image forming apparatus, the method comprising:
outputting a plurality of light beams;
detecting a first horizontal synchronization signal corresponding to a first of the plurality of light beams;
outputting first video data corresponding to the first of the plurality of light beams;
generating a second horizontal synchronization signal based on the first horizontal synchronization signal and offset therefrom; and
outputting second of the plurality of light video data corresponding to a second of the plurality of light beams.

* * * * *